(12) United States Patent
Ferlitsch (10) Patent No.: US 7,715,027 B2
(45) Date of Patent: May 11, 2010

(54) METHOD AND APPARATUS FOR EMBEDDED DRIVER DOWNLOAD USING RAW IMAGING PROTOCOL

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1173 days.

(21) Appl. No.: 10/763,665

(22) Filed: Jan. 23, 2004

(65) Prior Publication Data
US 2005/0162675 A1 Jul. 28, 2005

(51) Int. Cl.
G06F 3/12 (2006.01)
G06K 15/00 (2006.01)
G06K 9/445 (2006.01)
G06F 15/177 (2006.01)

(52) U.S. Cl. ............... 358/1.13; 358/1.14; 358/1.15; 717/176; 717/171; 709/220

(58) Field of Classification Search .......... 358/1.13, 358/1.15, 1.11, 1.14, 1.16, 1.17, 1.18; 379/412; 709/220, 229; 710/10, 104
See application file for complete search history.

(56) References Cited

U.S. PATENT DOCUMENTS

| | | | |
|---|---|---|---|
| 5,647,056 A * | 7/1997 | Barrett et al. ............ | 709/220 |
| 5,960,167 A | 9/1999 | Roberts et al. | |
| 6,009,480 A | 12/1999 | Pleso | |
| 6,091,508 A | 7/2000 | Love et al. | |
| 6,522,420 B1 * | 2/2003 | Chadez et al. ............ | 358/1.15 |
| 7,231,435 B2 * | 6/2007 | Ohta .......................... | 709/221 |
| 7,430,736 B2 * | 9/2008 | Nguyen et al. ............ | 717/176 |
| 2002/0097421 A1 * | 7/2002 | Lomas et al. ............. | 358/1.14 |
| 2002/0147795 A1 | 10/2002 | Cantwell | |
| 2003/0048473 A1 * | 3/2003 | Rosen ....................... | 358/1.15 |
| 2003/0051084 A1 | 3/2003 | Rosen | |
| 2003/0204950 A1 * | 11/2003 | Chou et al. ................ | 29/854 |

FOREIGN PATENT DOCUMENTS

| | | |
|---|---|---|
| EP | 1 056 001 A2 | 5/2000 |
| JP | 2002197044 | 7/2002 |
| WO | WO 00/33232 | 6/2000 |

* cited by examiner

Primary Examiner—King Y Poon
Assistant Examiner—Neil R McLean
(74) Attorney, Agent, or Firm—David C. Ripma; Jon M. Dickinson; Robert D. Varitz (57) ABSTRACT

A communication-associated structure and process utilizing (a) a client device, (b) a communication port, and (c) an imaging device which includes an embedded driver and related configuring information. The process, employing these structural elements, involves communicatively associating the two devices through the communication port, and thereafter, and making use of the embedded driver and related configuring information, equipping the client device with a fully configured installation of that driver. This equipping is accomplished through the specific steps of downloading, from the imaging device to the client device, the embedded driver and related configuring information, and thereafter auto-configuring the downloaded driver with the downloaded configuring information.

7 Claims, 6 Drawing Sheets

METHOD AND APPARATUS FOR EMBEDDED DRIVER DOWNLOAD USING RAW IMAGING PROTOCOL

This invention relates to a communication-associated process involving imaging-related interaction between a client device (a computer) and an imaging device, such as a printer, a scanner, a facsimile machine, a copier, a multi-function peripheral, an electronic whiteboard, a tablet PC, a CD burner, and others. In particular, the invention pertains to a method and a structure regarding the requested downloading, from an imaging device to a client device, of an appropriate imaging driver, and of related configuration information, which driver and information are referred to herein as an associated pair embedded in the imaging device, followed by auto-configuring of the downloaded driver in the client device. For the purpose of illustration herein, the invention, in its preferred and best-mode form and manner of practice, is described herein in a context wherein the imaging device is a printer, and the requested driver is a printer driver.

In prior art practice, once an imaging device, such as a printer, is installed on a client device computer, an appropriate driver, such as a printer driver, is then installed and configured, usually manually. Speaking in terms of a printer being the subject imaging device, the appropriate driver is one that is (a) specifically designed for that printer, and (b) also compatible with, for example, the operating-system version possessed by the client device. It is typical for such a driver to be installed either from a collection of various drivers that have been supplied with the client-device operating system, or from a separate device, such as a CD-ROM.

Not only is the usual manual installation and configuration process appreciably time-consuming, and one which needs to be done typically whenever device updating occurs, it is often the case that a driver made available from such conventional sources is not the most current version of the most appropriate driver. Such a non-current driver might, as an illustration, not permit accurate and full configuring in relation to the actual capabilities of the installed printer, and it might also, as a consequence of human error, not at all be the right driver to install in the first place.

The method and structure of the present invention squarely address these and other prior-art imaging-driver installation and configuration issues. They do so in a special manner (mentioned briefly above), wherein the correct driver, which comes embedded with an installable imaging device, along with the likewise embedded driver-configuration information, are directly downloaded as a pair, in what is referred to herein as a single event, from the imaging device to a requesting client device.

Conveniently, and uniquely, the request for, and the resulting delivery of, this material (driver and configuration information) take place via the very same bi-directional communication port which will ultimately be employed for the exchange of imaging-job data between the two devices. The request and response (download) activities also take place under circumstances wherein the imaging device has not yet been installed on the client device. In fact, and preferably, they (request and response) function as procedures that are tightly integrated with the usually provided add-device process which the client device is equipped to invoke. Using the received driver and configuration information, the client device employs the add-device process, among other things, to auto-configure the driver as the imaging device itself is being installed on the client device.

As will be seen, the invention, which offers a new and efficient way accurately to load and configure an imaging driver, may be employed not only via the direct communication-port interface which exists bi-directionally between a directly connected client device and imaging device, but also in a setting wherein an imaging server "sits" intermediate these two devices. In the detailed description of the invention which is set forth below, the features of the invention are discussed in an illustrative situation wherein the employed communication port is a bi-directional RAW port 9100. Other ports may, of course, be used if desired. For example, a useful alternative port might be IEEE 1284 ECP (parallel port).

These and other features and advantages of the present invention will become more fully apparent as the description which now follows is read in conjunction with the accompanying drawings.

DETAILED DESCRIPTION OF THE INVENTION

Figure 1:
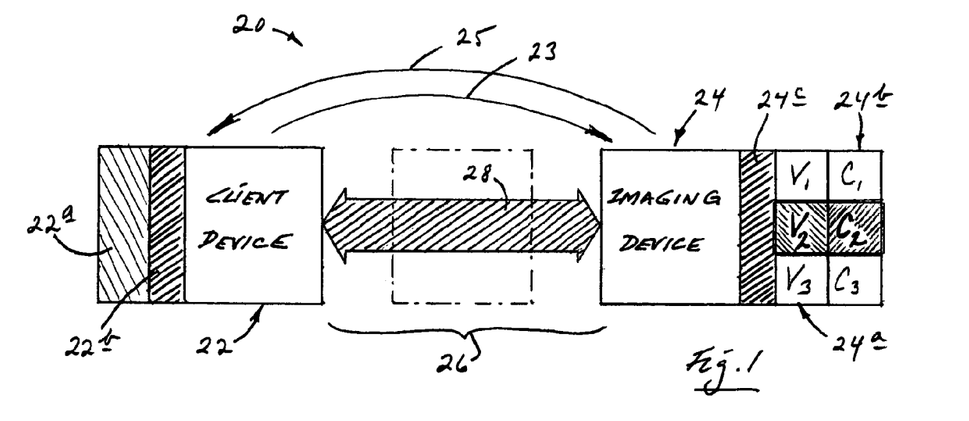
FIG. 1 is a high-level block/schematic drawing illustrating two embodiments of, and manners of practicing, the structure and methodology of the present invention.

Turning now to the drawings, and beginning with FIG. 1, this figure gives a complete, high-level overview of both a preferred and best-mode embodiment of, and manner of practicing, the present invention. FIG. 1 additionally illustrates one modified form of the invention. The preferred invention form is pictured by the solid-line contents of FIG. 1. The modified form is illustrated by those same solid-line contents, augmented by the dash-dot block (an imaging server) shown in the center of the figure. A common reference number 20 which appears in FIG. 1 will be used and referred to hereinafter to designate generally the entirety (a) of the system, (b) of the apparatus within the system, and (c) of the methodology, of both forms of the invention.

Starting with the solid-line contents of FIG. 1, and describing the invention initially in structural terminology, system 20 includes a client device (a computer) 22, an imaging device 24 (herein a printer), and a suitable communication medium, represented by a bracket 26. Medium 26 operatively and communicatively interconnects devices 22, 24, and may be of any suitable wired or wireless nature.

Computer 22 is, for illustration purposes herein, equipped with the Microsoft® Windows® 98 operating system. Under the control of this operating system, computer 22 includes the familiar stored-information registry, commonly referred to as the system registry, 22a. Computer 22 also possesses an implementable add-device process 22b which gives the computer the capability of installing a printer, such as printer 24. Process 22b, in collaboration with the mentioned operating system, constitute both what is also referred to herein as a request structure, and as a portion of an auto-configure structure.

Printer 24 possesses certain embedded information relevant to its operation. Specifically it includes embedded printer-driver information 24a, and related, embedded driver-configuring information 24b. In the particular situation now being described, driver information 24a includes three versions, $V_1$, $V_2$, $V_3$, of a printer driver, one of which version, version $V_2$ (highlighted), is designed for compatibility with the Windows® 98 operating system in computer 22. Similarly, configuring information 24b includes three versions, $C_1$, $C_2$, $C_3$, of such information, which versions are intended for use, respectively, with driver versions $V_1$, $V_2$, $V_3$. Configuring version $C_2$ is highlighted in FIG. 1.

This embedded driver and configuring information is up to date, and is fully and comprehensively accurate with respect to all of printer 24's standard and installed options, capabilities, etc.

Printer 24 is also equipped to be capable of communicating outwardly, upon receipt of a suitable request (arrow 23), its embedded information, and to this end includes appropriate communication structure 24c. Communication structure 24c is also referred to herein as response structure, and as being a portion of the previously mentioned auto-configure structure. Outward communication from printer 24, also referred to herein as a response, is shown by arrow 25 in FIG. 1. The mentioned request, response and auto-configure structures are referred to further herein as being distributively present in system 20.

In the otherwise "normal course of business" between computer 22 and printer 24, when the printer has been installed on the computer, and the computer has additionally had installed in it the appropriately configured printer driver, the computer and printer exchange print-job (imaging-job) information through a properly configured, bi-directional printer port which was configured at the time of installation of the printer on the computer. Such a port, properly configured, is assumed in FIG. 1 to be "in place", and is represented by broad, double-headed, shaded arrow 28. Port 28 herein is preferably the well-known bi-directional RAW port 9100. Other ports may, of course, be used as well, and if so desired. One such other port for port 28 might be IEEE 1284 ECP (parallel port).

In the special construction and practice of the present invention, matters effectively begin under circumstances wherein, while computer 22 and printer 24 are connected through medium 26, the otherwise "initial" status is that printer 24 has not yet been installed on computer 22, and is not yet equipped with driver $V_2$, let alone with a properly $C_2$-configured $V_2$ driver.

Under these circumstances, the user, from computer 22, identifies, selects, and configures RAW port 9001 (28), and then initiates add-printer (add-device) process 22b.

In accordance with the preferred form of the invention, invocation of process 22b triggers a series of events which begin with sending from computer 22 (the client device) to printer 24 (the imaging device), and via port 28, a request for a download (from the printer to the computer) of the appropriate printer driver $V_2$, and of the appropriate, relevant configuration information $C_2$.

Considering the other drawing figures now along with FIG. 1, and describing aspects of the invention using the more general terms "client device" and "imaging device", as mentioned earlier, an imaging driver compatible with the imaging device is embedded in the imaging device. The imaging device may contain more than one instance of the imaging driver ($V_1$, $V_2$, $V_3$) for reasons such as the need to recognize and accommodate:

1. Different operating systems, and operating system versions;
2. Different access controls; and
3. Different features.

The imaging device, in accordance with practice of the present invention, supports a method (a) for receiving a request, and (b), in response to such a request, for downloading one of the embedded imaging drivers to an imaging client (computer 22).

According to this invention, the same port and communication method employed for de-spooling of an imaging job to and from an imaging device is used for downloading the embedded imaging driver. Typically, an imaging device will support at least one bi-directional port for accepting imaging jobs, such as RAW port 9100 for printing. As has already been mentioned, port 28 is such a port. In the case of RAW port 9100, the port can accept imaging tasks that are either:

1. Imaging commands, and data to process as an imaging job, such as a print job; and
2. Requests to return specific imaging information.

In the latter case, and with respect to RAW port 9100 for printing, this port will accept PJL USTATUS commands. This command format supports requests for information, such as device status and configuration, to be sent back to the requester (here, a client device). The requested information is then sent as a streaming byte stream to be interpreted by the requester.

Thus, RAW port 9100 will accept a command syntax which indicates a request for a download of one of the embedded drivers, as well as such a request which further contains information that is useable to determine which instance (version) of the driver to download. Presented immediately below is an example of how such a request might appear:

| | |
|---|---|
| Esc%-12345X | # Universal Exit Language |
| @PJL | # Indicator that command syntax is PJL format |
| @PJL INFO DRIVER=Win98 | # Request to download a driver for Windows 98 |

After receiving and recognizing such a request, the port obtains from the imaging-device firmware the embedded driver associated with the request, such as the driver that relates to the Windows® 98 operating system, as in the above example.

Figure 2:
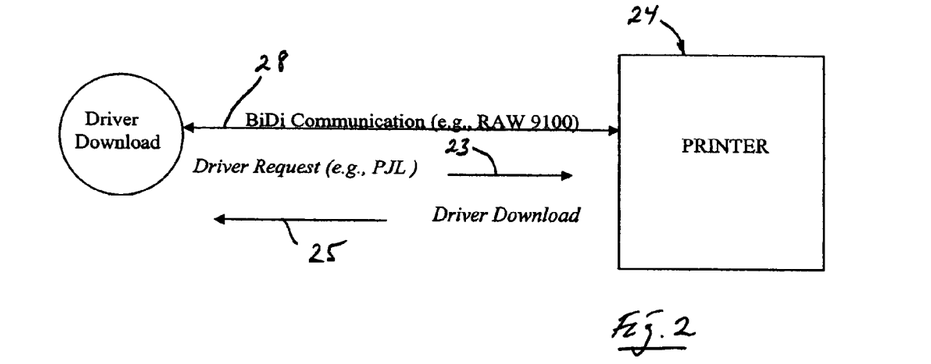
FIG. 2 is a block/schematic diagram illustrating a basic client-device request for the download of an embedded imaging device driver.

The port then sends back as a byte stream to the requester, over the same connection, the embedded imaging driver. FIG. 2 is illustrative of this situation.

Figure 3:
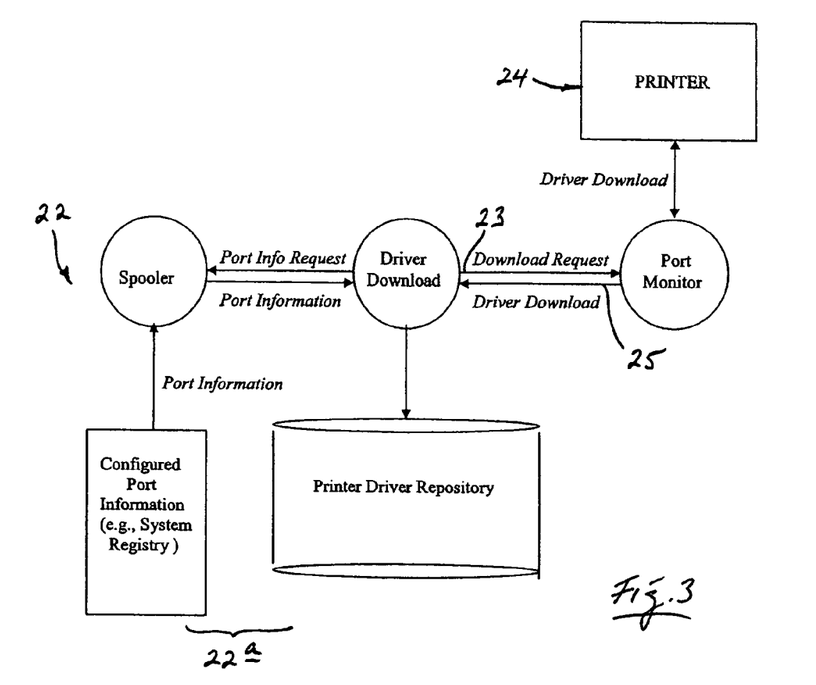
FIG. 3 is a block/schematic view illustrating requested access to information relative to choosing the appropriate data port for the transfer of information between a client device and an imaging device.

FIG. 3 pictures generally a predecessor behavior which is performed in accordance with practice of the invention. This behavior involves recognition of, selection of, configuration of, and connection to, the appropriate driver communication port. Preferably, and as described herein, this is RAW port 9100.

In the embodiment of and manner of practicing the invention that are now being described, the port information for bi-directional communication to download the embedded driver, along with the related configuring information, from the imaging device is obtained from the spooler during the conventional create-installed-printer (add-device) process (22b in FIG. 1).

When an installed imaging device, such as an installed printer in Microsoft Windows®, is created, the imaging port is specified as part of the creation process. The imaging spooler that manages the installed imaging device, such as the printer spooler in Windows® 98, stores the port information, such as in the system registry (22a in FIG. 1) in Microsoft Windows® 98.

Once the port information is specified and stored by the imaging spooler, a driver download process, as generally mentioned earlier, queries the imaging spooler to obtain the port information associated with the installed imaging device which is being created. Communication information, such as an IP address and a port type, are then extracted from the port information. Using the extracted port information, the driver download process then establishes the required bi-directional connection to the corresponding port on the imaging device. As illustrated in previously mentioned in FIG. 2, the driver download process thereafter makes a request from the imaging device for the embedded imaging driver. After receipt of this driver, the driver download process stores the imaging driver components in the imaging client's imaging driver repository—registry 22a.

Continuing a description of the structure and methodology of the invention, the contents of FIGS. 4-9, inclusive, are now described and discussed in sequence.

Figure 4:
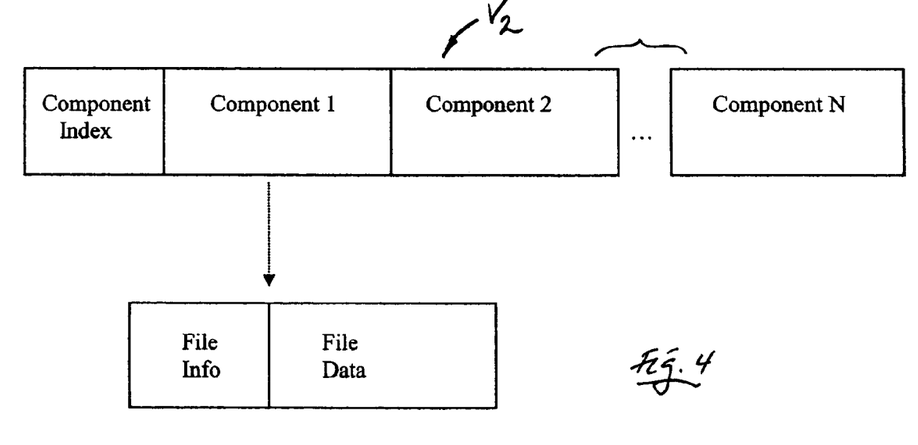
FIG. 4 is a block diagram of an embedded printer-driver component byte stream as delivered from a printer to a client computer.

Beginning with FIG. 4, this figure illustrates a representative imaging-device byte stream. As those skilled in the art will understand, such a stream will typically, but not always, include:

1. A run-length indicator of the length of the byte stream;
2. A component index describing partitioning of the byte stream into separate components; and
3. A sequence of one or more components.

For the purposes of the present illustration, each component represents an individual entity of an installation, typically a file, or files, such as dynamic link libraries, executables, and installation procedures (e.g., .inf in Windows® 98). Each file component consists of at least a header that describes information both about the file, and about the file data. Such a header will normally contain information such as:

1. Size of File Header and File Data;
2. Purpose of file (e.g., DLL, installer, etc);
3. Compression method;
4. Name of file; and
5. Location regarding where to install the file on the imaging device.

In relation to this information, if a file is compressed, the driver download process will automatically decompress the file data according to the indicated compression method. Where a component is identified as an executable installer, that installer will then automatically be run by the driver download process after completion both of that download process, and of decompression of any compressed files. When an installer is executed, the imaging driver is added to the system's driver repository (registry 22a).

Another viable setting is one wherein the imaging device encrypts the download material, such as by using a public key associated with the client device (i.e., public/private key encryption), with such encrypted information then being decrypted during the download process.

Figure 5:
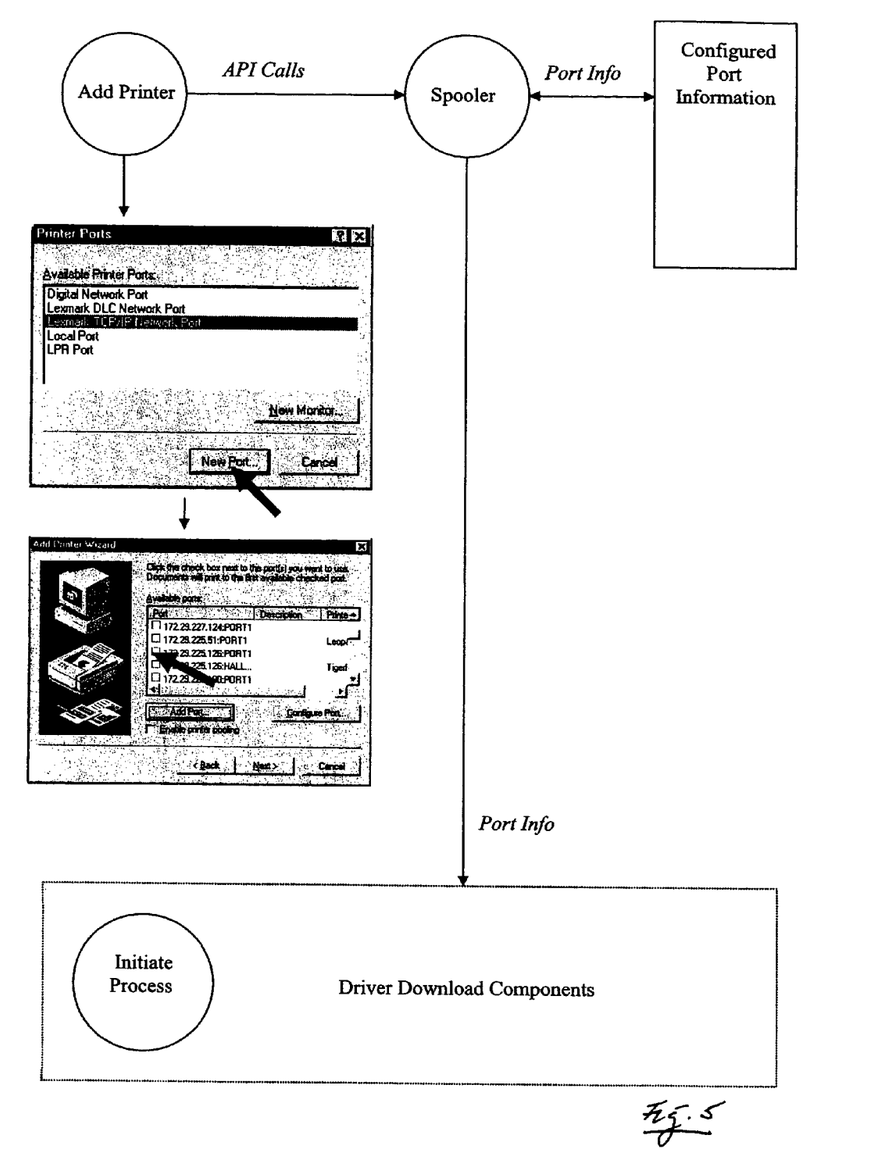
FIG. 5 is a block/schematic illustration showing practice of a portion of the invention involving communication port confirmation in a setting employing an add-device process which is employable by a client computer.

FIG. 5 pictures (schematically) RAW port 9100 configuring as a part of the event of creating an installed imaging device—printer 24. Specifically, this figure illustrates using the Add Printer functionality of the Microsoft Windows® family of operating systems to create a locally installed printer. In this illustration, the user performs the following steps:

1. Opens the printer folder and clicks on the Add Printer icon;
2. Selects the local printer; and
3. Selects an existing port, or configures a new port.

Once the user selects an existing port, or configures a new port, the port is known to the print spooler. At this point, the user then invokes the driver download process of the present invention. This process, user assisted, then performs the following actions:

1. Queries the print spooler for ports (e.g., EnumPorts( ));
2. Displays a drop-down list of ports;
3. The user identifies the port associated with the printer, and selects the identified port;
4. Establishes bi-directional communication with the selected port;
5. Issues a download request to the printer;
6. Receives the downloaded driver from the printer;
7. Processes the download driver as described above (e.g., decompresses, decrypts, runs auto-installer, etc.); and
8. Informs the user of the name of the downloaded driver, and/or the location of the downloaded components.

Once the driver download process has completed, the user then continues with the Add Printer process, as follows:

1. Selects a printer driver
    (a) If an installer was run as part of the download process, the driver will show up in the Add Printer's dialog of manufacturer's printer drivers (i.e., driver repository);
    (b) If not, the user will use the browse functionality to locate the .inf file; and
2. Names the installed printer.

Figure 6:
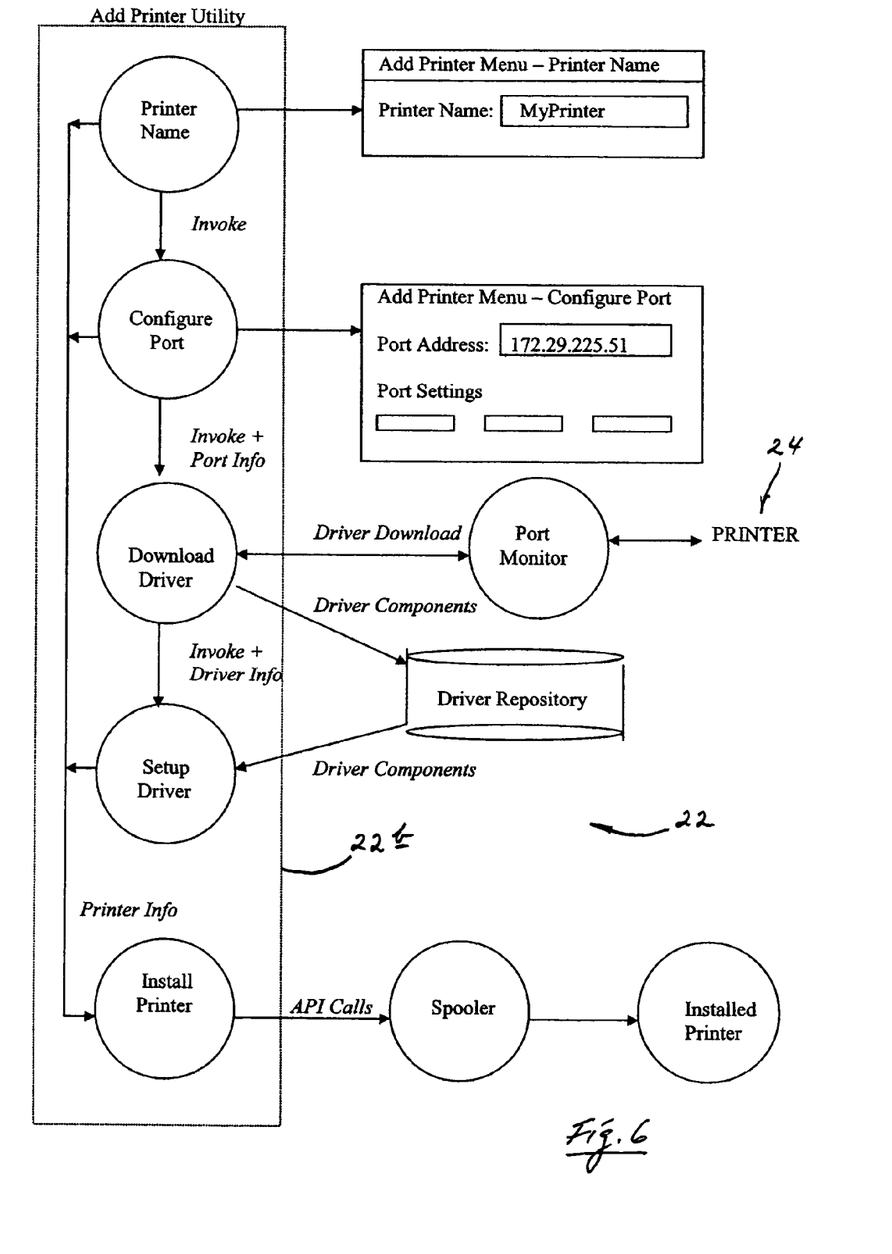
FIG. 6 illustrates, in block/schematic form, use of the invention under circumstances involving creating, in a client computer, an installed printer employing an add-device process.

FIG. 6 illustrates diagrammatically the use of an all-in-one utility to create an installed imaging device. For example, in the Microsoft Windows® family of operating systems for creating a locally installed printer, such a utility, assisted by a user, will perform, illustratively, the following actions:

1. User selects an existing port, or configures a new port;
2. Establishes bi-directional communication with the selected port;
3. Issues a download request to printer;
4. Receives the downloaded driver from the printer;
5. Processes the downloaded driver as described above (e.g., decompress, decrypt, run auto-installer, etc.);
6. Installs the imaging driver into the driver repository (such as registry 22a);
7. User names the installed printer; and
8. Issues commands to the print spooler to create a locally installed printer using the named, port and driver.

Figure 7:
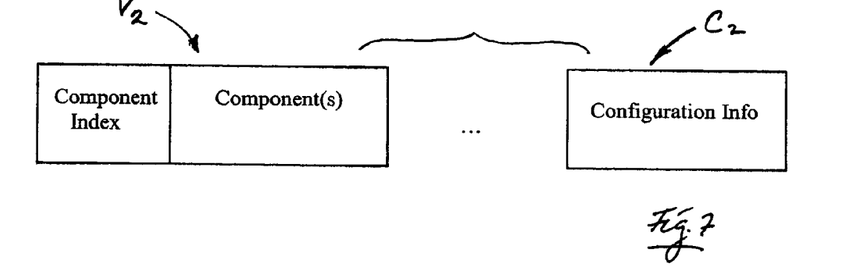
FIG. 7 illustrates certain aspects of an auto-configure practice involving implementation of the invention.

FIG. 7 in the drawings pictures an automatic driver configuration byte stream. One of the components of a driver download herein is information on how the imaging device in which the driver is embedded is configured. Configuration (or configuring) information relates to those features of the imaging device that are modifiable. These typically include:
1. Finisher attachments (e.g., stapling);
2. Output path attachments (e.g., duplex);
3. Input Tray attachments (e.g., large capacity cassette);
4. Storage (e.g., hard-disk and RAM);
5. Embedded/Downloaded data (e.g., fonts, forms); and
6. Device Settings (e.g., communication protocols on/off).

The file index for this component information indicates that this is configuration-related information, and contains instructions on where to store the information (e.g., pathname, system registry layout, etc.), such that it can be used by the driver to auto-configure itself in accordance with the invention when an installed imaging device is created.

Figure 8:
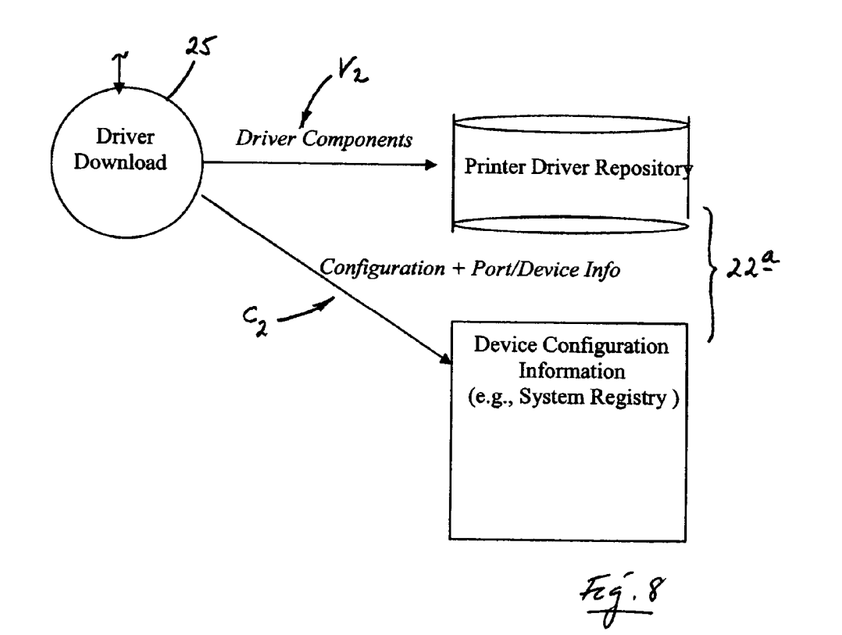
FIG. 8 illustrates another form of an auto-configure practice associated with the invention.

Turning attention now to FIG. 8 in the drawings, this figure pictures, with respect to automatic driver configuration, the process of associating configuration information with the subject imaging device. As described above, configuration information is stored on the imaging client via a method that is accessible by the imaging driver on a subsequent creation of an installed imaging device. The specific storage and data layout method can be any suitable conventional method that the imaging driver will recognize. Typically, to distinguish to which physical device the configuration information pertains, the data is associated with at least one of:
1. The port; and/or
2. The device.

Figure 9:
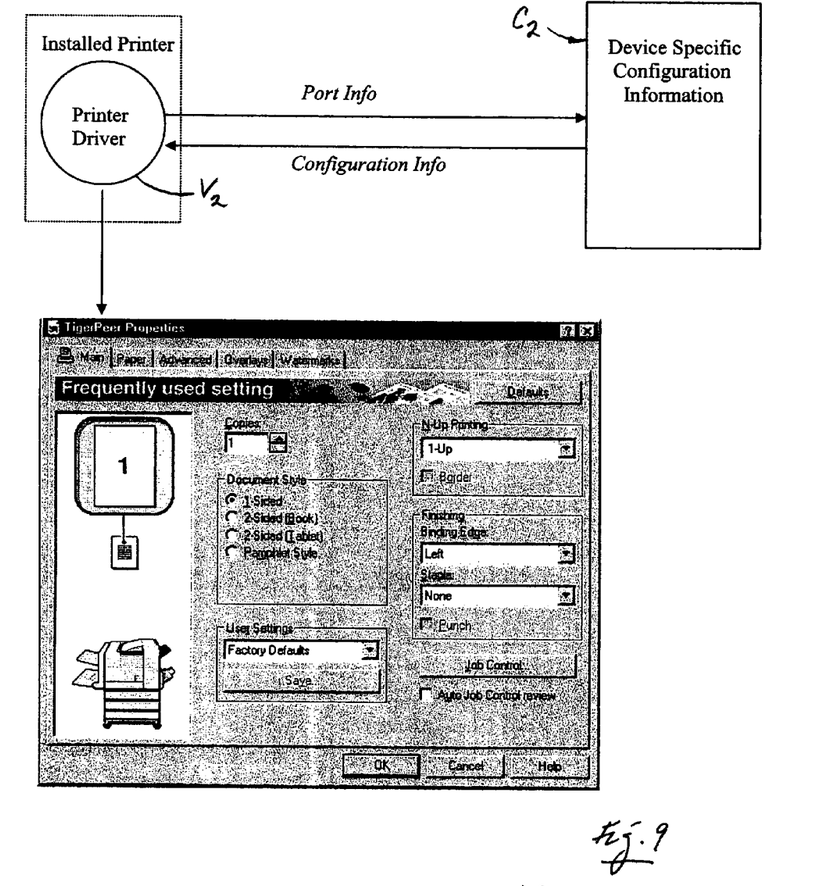
FIG. 9 further illustrates an auto-configure practice.

With attention directed now to FIG. 9, this figure illustrates how a downloaded driver obtains configuration information during driver auto-configuring. By the time of performance of this step of the invention, the configuration information associated with the port/device is already stored on the imaging client in a manner that will be recognized by the imaging driver as already being configured. When the created, installed imaging device is invoked (e.g., to initiate a print job), the imaging driver obtains the configuration information associated with the respective port/device, and dynamically configures the imaging job option menu and driver capabilities.

Sharp Corporation AR-M/P350/450 printer drivers are examples of commercial printer drivers that dynamically configure the available print option selection according to configuration information. In these printer drivers, a driver checks the private area of the system registry for a subkey with the same name as the port associated with the installed printer. If the subkey exists, then the printer driver obtains the configuration information under the subkey, and dynamically configures itself.

Figure 10:
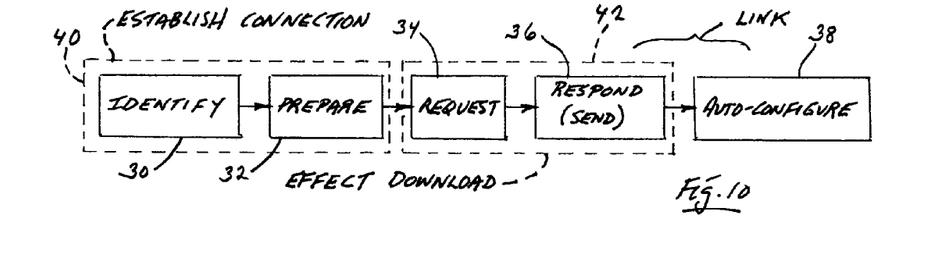
FIG. 10 is a block/schematic flow diagram illustrating the step-architecture of the methodology of the invention.

FIG. 10, in a block/schematic flow diagram format, describes (illustrates) the methodology of the present invention. Included in this diagram are five solid-outline blocks 30, 32, 34, 36, 38, and two dashed-outline blocks 40, 42. Block 40 is made up of blocks 30, 32, and block 42 is made up of blocks 34, 36.

Block 30, labeled "IDENTIFY", represents the step of the invention involving identifying a bi-directional communication port (28) for enabling communication between client device 22 and imaging device 24. Block 32, labeled "PREPARE", represents the step of preparing port 28 for such use. These two steps, blocks 30, 32, combine in dashed block 40, labeled "ESTABLISH CONNECTION", to perform the overall step of establishing an operative connection between devices 22, 24.

Block 34, labeled "REQUEST", represents the invention step of requesting the delivery, from device 24 to device 22, of embedded driver and configuration information. Block 36, which is labeled "RESPOND (SEND)", represents the responsive sending, from device 24 to device 22, of this requested information. Dashed block 42, labeled "EFFECT DOWNLOAD", represents the combined behaviors of blocks 34, 36 to effect what is referred to herein as a companion delivery download of driver and configuration information to device 22.

Block 38, identified with the label "AUTO-CONFIGURE", represents the step of the invention involving auto-configuring, in client device 22, of the downloaded driver utilizing the downloaded configuration information.

Thus, the present invention offers a simple, unique and efficient structure and methodology for embedded-driver downloading and auto-configuring from an imaging device to a client device using an imaging-device port (e.g., RAW port 9100) which will ultimately be employed to exchange imaging-job data. The structural elements which cooperate in the invention include (a) an imaging device, (b) a client device, (c) an imaging-device communication port, and (d) what is referred to herein as combined and distributed request (22*b*), response (24*a*, 24*b*), and auto-configure (22*a*, 22*b*, 24*a*, 24*b*) structure.

To set the stage for implementation and practice of the invention, one begins by establishing an appropriate operative connection (bracket 26) between a client device and an imaging device, and specifically such a connection which is bi-directional. This basic operative connection communicatively associates these two devices, according to the invention, and does so in a manner which facilitates cross-communication between them via a selected and properly configured imaging-device port, such as RAW port 9100. This port is identified and prepared for use following establishment of the medium interconnection between the devices.

Following port establishment, the user invokes the client-device add-device process which is "on-board" the client device. According to the preferred form of the invention, this add-device process is integrationally linked with the subsequent invention activities involving requesting (or issuing a request), down-loading (or delivery or sending), and auto-configuring the appropriate imaging driver with the correctly associated configuration information. This activity results in equipping of the client device with a fully configured and installed driver.

The operation of the invention just described is substantially the same under circumstances where an imaging server "sits" between a client device and an imaging device (see the central, dash-dot block in FIG. 1 which represents such an imaging server).

I claim:

1. A method for single-event auto-downloading as a pair to a selected, download-requesting client device, for the auto configuring therein of an imaging-device driver, an imaging device driver and associated configuration-information, which associated driver/configuration-information pair is (a) specifically compatible with the selected client device's operating system, and (b) embedded, as an associated pair, within the imaging device's included firmware, along with, and as a part of, a plurality of similarly embedded, client-device-requestable, associated driver/configuration-information pairs that are specifically compatible, each as an associated pair, with a different client-device operating system, said method comprising establishing between the selected client device and the imaging device an operative connection, including a bi-directional, imaging-device communication port which is (a) compatible with both devices, and (b) the port via which imaging-job information will be exchanged between the devices, with respect to said establishing, and utilizing the mentioned port, effecting, via a single, client-device-implemented request, a companion, single-event download delivery therethrough directly from the imaging device to the selected client device of the embedded, associated driver/configuration-information pair which is specifically compatible with the selected client device's defined operating system, and in association with said single-event effecting, and the resulting single-event, direct-from-imaging-device, client-device-requested download delivery, auto-configuring, in the selected client device, the thus directly delivered imaging driver utilizing the thus directly delivered, paired configuration information.

2. The method of claim 1, wherein said effecting includes issuing from the client device to the imaging device the mentioned client-device request though the communication port for the direct delivery of the paired driver and the configuration information.

3. The method of claim 2, wherein the communication port employed is RAW port 9100.

4. The method of claim 2, wherein the communication port employed is IEEE 1284 ECP parallel port.

5. The method of claim 2 which is employed with a client device which possesses an add-device process, and which further comprises integrationally linking the process of client-device-requesting, direct downloading and auto-configuring with such process.

6. The method of claim 5, wherein the communication port employed is RAW port 9100.

7. The method of claim 5, wherein the communication port employed is IEEE 1284 ECP parallel port.

* * * * *